United States Patent [19]

Andrews

[11] Patent Number: 4,887,380

[45] Date of Patent: Dec. 19, 1989

[54] BAIT TANK

[76] Inventor: Del Andrews, 919 M Calle Amanacer, San Clemente, Calif. 92672

[21] Appl. No.: 297,191

[22] Filed: Jan. 17, 1989

Related U.S. Application Data

[63] Continuation of Ser. No. 76,771, Jul. 27, 1987, abandoned.

[51] Int. Cl.$^4$ .............................................. A01K 97/04
[52] U.S. Cl. ............................................ 43/56; 43/57
[58] Field of Search ........................ 43/56, 57; 119/5; 261/121.2

[56] References Cited

U.S. PATENT DOCUMENTS 2,936,542  5/1960  Butler ..................................... 43/57
4,037,349  7/1977  Key ....................................... 43/57

Primary Examiner—Kurt Rowan
Attorney, Agent, or Firm—Cislo & Thomas

[57] ABSTRACT

An improved bait tank which can maintain bait over a prolong period by injecting water in a circular motion in the upper portion of the tank and withdrawing it near the bottom. The flow of water in this manner flushes scales, feces and other debris out of the tank. It also eliminates bubbles, which are harmful to bait. The water level in the tank is adjusted by an extension of the outlet pipe which rises to the desired level of the water in the tank. Interior fill pipes are eliminated, leaving an unobstructed smooth surface on the interior of the tank.

10 Claims, 2 Drawing Sheets

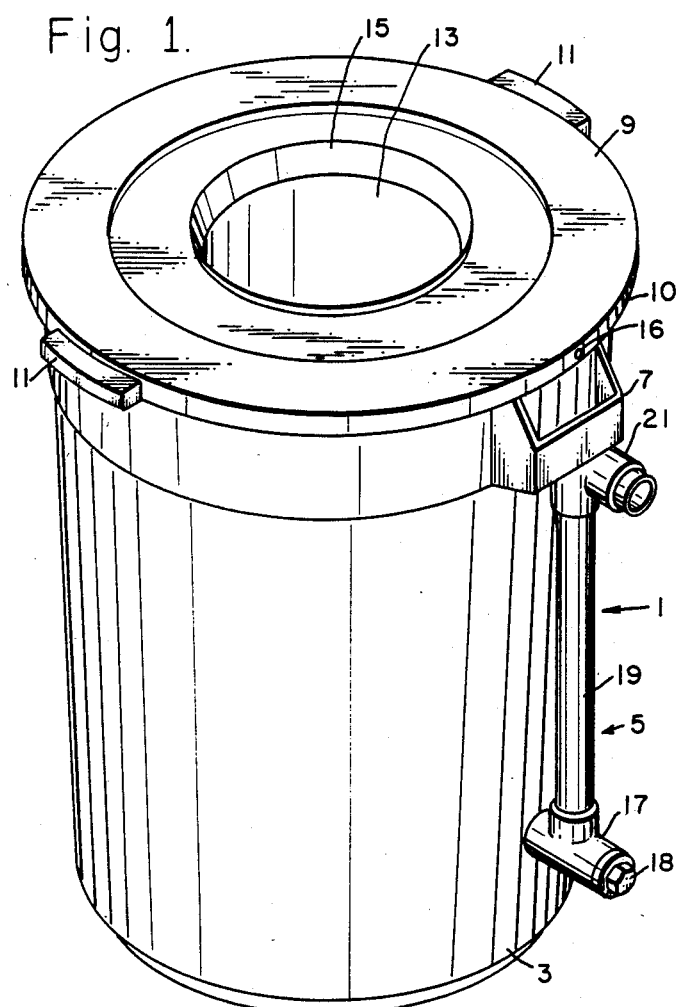
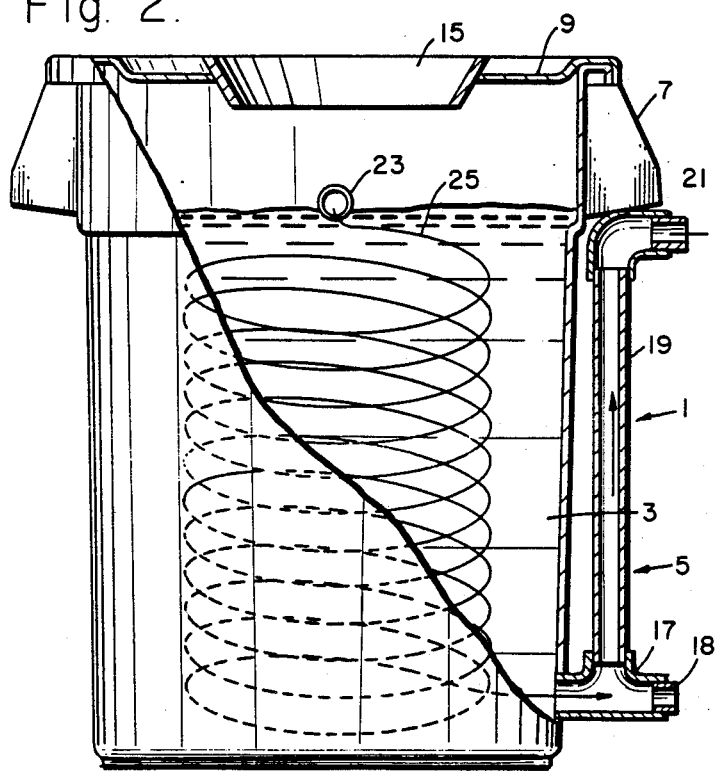
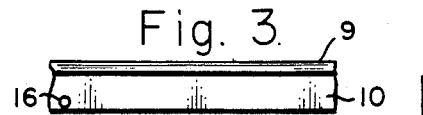
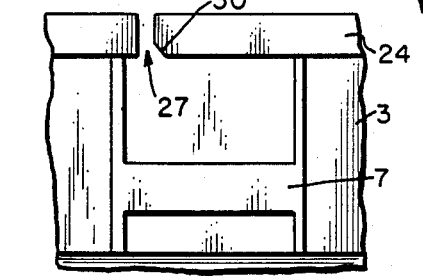
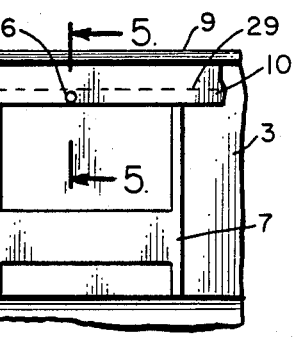
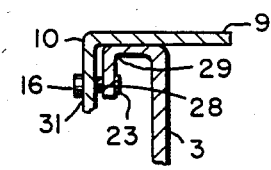
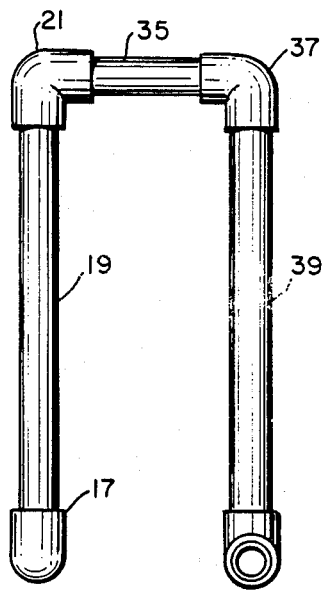

BAIT TANK

CROSS-REFERENCE TO RELATED APPLICATION

The present application is a continuation application of application Ser. No. 07/076,771, filed July 27, 1987, now abandoned.

BACKGROUND OF THE INVENTION

The present invention is directed towards an improved tank which is particularly useful in keeping bait alive. Fishermen have for a long time experienced problems in maintaining bait over extended periods of time. This is particular so on extended fishing trips. There have been several attempts to solve this problem, as indicated by a number of patents that have issued in this field.

One such patent is U. S. Pat. No. 4,146,989, entitled, "Bait Tank". This patent discloses a storage tank within a housing. The housing has a water inlet between the circumference of the tank and the housing. It is connected to a vertical water inlet means along the storage tank. Water is pumped into the bottom inlet under pressure and is forced up through the vertical inlet. It is released from the vertical inlet into the tank through a series of holes spaced from the bottom of the tank to the top of tank. On the opposite side of the tank is a water outlet means similar in construction to the water inlet means and consisting of ports along the wall of the storage tank so that water can escape into a vertical outlet channel located between the tank and the housing. This water is then drained from the bottom of the water outlet channel.

In another modification as disclosed in U. S. Pat. No. 3,797,160, entitled, "Self Flushing Live Bait Container for Power Boats", the bait container is hung on the rear of the power boat and a tube from the top of the container is attached to a vertical pipe suspended on the stern of the boat. At the bottom of that pipe is a scoop. As the boat proceeds through the water, water is forced through the pipe by entering the forward end of the scoop and from thence into the top of the bait container. There are perforations on the side of the tank to allow the water to escape.

OBJECTS AND SUMMARY OF THE INVENTION

It is an object of the present invention to provide a bait tank which can sustain live bait over a long period of time.

It is a further object of this invention to provide a bait tank which is particularly useful in prolonging the life of anchovies and other baits.

It is an additional object of this invention to provide a portable tank which can be used aboard a boat on a fishing trip.

The present invention utilizes a tank having a liquid inlet means at or near the top. The internal portion of this means is designed to inject water into the tank in a circular manner. It then circulates in a spiral fashion around the tank and gradually descends towards the bottom. At or near the lower level of the water in the tank, there is an outlet which in turn is connected to a pipe that rises along the outside wall of the tank. This pipe extends as high as the desired water level in the tank. Because of the spiral circulation and the outlet near the bottom, debris is flushed from the tank. Scales or bubbles can lodge in the gills and kill the bait. This tank eliminates both problems.

In a preferred embodiment, the tank is circular and the interior is essentially free of obstructions. This is particularly important with anchovies, which are very fragile. It is also important to provide a light for use with anchovies, which will otherwise die overnight.

A preferred cover for the tank has a central opening with a depending rim. This helps to control splashing in the tank.

A flow restriction on the inlet is ideally adjusted to allow water turnover three to five times per hour.

A BRIEF DESCRIPTION OF THE DRAWINGS

FIG. 1 is perspective view illustrating the improved bait tank.

FIG. 2 is a side elevational view partially in section illustrating the flow of liquid through the tank and out through the external piping.

FIG. 3 is a partially segmented exploded view illustrating a novel interlock system between the top of the tank and the cover.

FIG. 4 is the same as FIG. 3 but with the cover in place.

FIG. 5 is a detailed illustration of the interlock between the cover and the tank taken along the line 55.

FIG. 6 is an elevational view of a second liquid outlet means.

DESCRIPTION OF THE BEST EMBODIMENTS CONTEMPLATED

Figure 7:
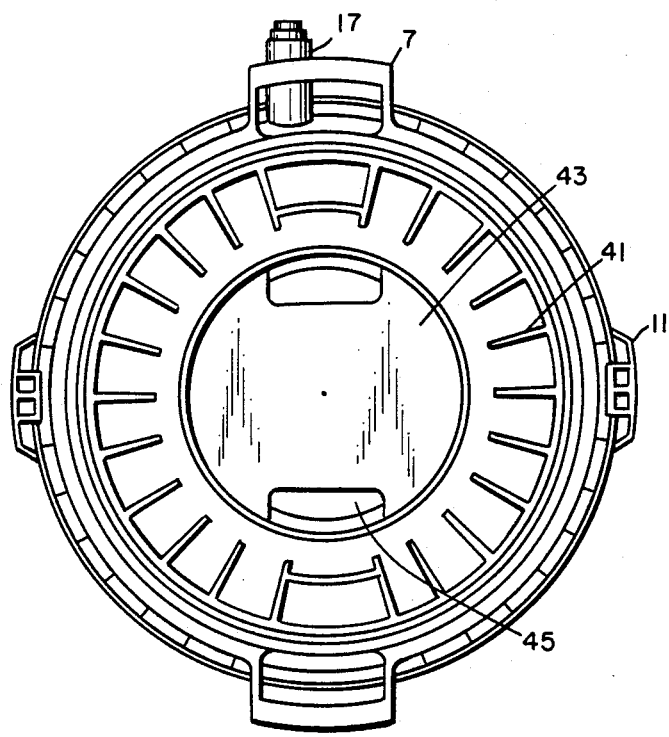
FIG. 7 is a bottom view of the tank illustrating interlocking flanges as twist-on lock means.

Referring to the figures wherein the same elements have the same numbers throughout, FIG. 1 shows an improved bait tank 1 of the present invention. In this embodiment, the tank has a circular side wall 3, fluid outlet means 5, handle 7, top 9, opening 13, an inwardly depending lip 15 to control splash, and means for locking the top to the tank proper illustrated at 17. The outlet means consists of horizontal pipe 17 extending from the lower portion of the tank and terminating in drain plug 88. Horizontal pipe 17 is connected to vertical pipe 19 through union 23 and elbow 21 is at the top of pipe 19.

In FIG. 2 the flow of liquid is illustrated commencing with inlet pipe 23 which injects the fluid in a spiral motion as illustrated by line 25 until it emerges from the bottom of the tank through horizontal pipe 17 and then up through vertical pipe 19 through elbow 21 and s then discharged.

FIG. 3 is a fragmentary exploded view showing locking bolt 16 in depending exterior lip 10 of cover 9 and slot 27 in depending rim 29 of tank 1. Slot 27 runs from the bottom of depending rim 29 through the top thereof. When cover 9 is put on over tank 3, shaft 28 of bolt 16 fits in slot 27 and nut 23 on shaft 28 is located between depending rim 29 and depending exterior lip 10. Cover 9 is pressed down until bolt 16 is below the lower edge of depending rim 29. A bevel 30 on the lower edge of depending rim 29 at the bottom of slot 27 facilitates the rotation of cover 9, and bolt 16 then is locked under depending rim 29, shown in phantom.

FIG. 4 is the same as FIG. 3 but shows cover 9 in position over rim 29. It also illustrates the relationship of locking bolt 16 to slot 27.

FIG. 5 illustrates, in detail, a cross-section view taken along the line 5—5 in FIG. 4 showing, in fragment, a portion of tank 1, a portion of cover 9, depending exterior lip 10, depending rim 29, bolt 16 protruding through opening 31 in depending lip 10 and in position in slot 27 of depending rim 29. Also illustrated is nut 33 on the inner surface of depending rim 29.

FIG. 6 shows a second embodiment of fluid outlet means 5 in which elbow 21 is connected to a second horizontal pipe 35 and through elbow 37 to depending pipe 39. From there, it can be connected to any convenient discharge means, not shown.

FIG. 7 is a bottom view of tank 1 and shows multiple ribs 41 projecting inwardly to provide strength to the container, central recess 43 and interlocking flanges 45. By means of the recess 43 and flanges 45, tank 1 can be secured to the deck of a boat or other flat surface through interlocking flanges on the boat. (not shown)

Figure 8:
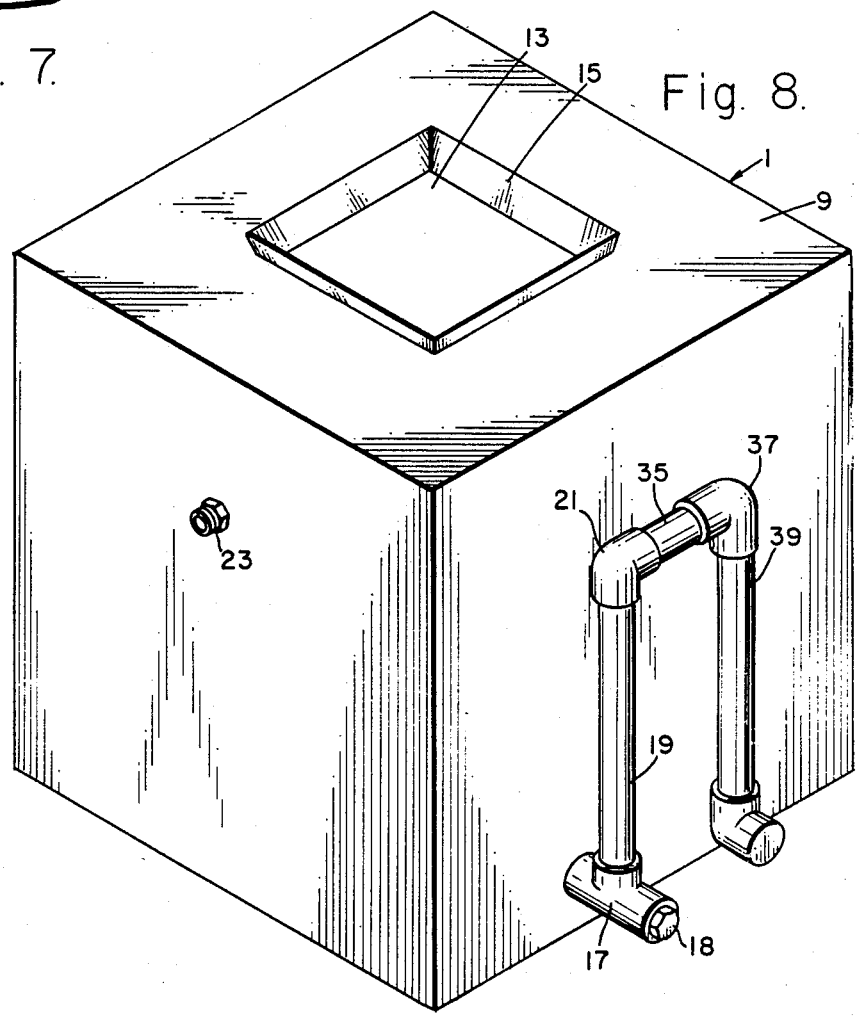
FIG. 8 is a perspective view of a modification of the improved bait tank.

FIG. 8 shows another embodiment of the present invention in which tank 1 is a square or rectangular structure. This view also shows the external connection of inlet pipe 23. This square structure has more stability and is preferably used aboard a ship.

The tank of the present invention can be made of any number of materials but obviously non-corrosive materials are preferred. If the tank is to be a portable tank, it is preferably made of plastic, such as polyethylene; on the other hand if it is only to be used in relatively permanent position, it can be made of non-corrosive metal. In addition, the tank of the present invention may be oval (not shown), but in general it should be relatively smooth on the inside with little or no protrusions, particularly if it is going to be used for transporting anchovies.

The invention has been described with relation to preferred embodiments. However, those skilled in the art will readily recognized that modifications and adaptations are obvious and are within the scope of the present invention.

What I claim is:

1. An improved bait tank for fragile bait comprising a container having a substantially unobstructed interior in which bait is to be held and having a fluid inlet of sufficient size and oriented at or near the top of said container, but below a predetermined fluid level to cause liquid to be circularly and downwardly injected into the tank in sufficient volume to create a downward flow in said container, said tank having a valveless fluid outlet at approximately the bottom of said tank, and having a valveless fluid conduit exterior of said tank connected to said fluid outlet and extending upwardly to about said fluid inlet and being adapted for causing continuous fluid flow from said fluid inlet downward to said fluid outlet, whereby the position of the said fluid conduit relative to the fluid level in said bait tank causes continuous fluid to flow upwardly from within said tank to the exterior thereof to flush debris from said bait tank, without creating bubbles.

2. The bait tank of claim 1 wherein the tank has a circular side wall.

3. The bait tank of claim 2 which has a tight fitting cover with a central opening from which depends a lip for controlling splash.

4. A tank of claim 3 which has interlocking means on the depending outer rim of the cover and the depending rim of the tank.

5. A bait tank of claim 4 wherein the interlocking means is a bolt and nut, the shaft of the bolt fits in a slot on the depending rim of the tank and locks in position when twisted.

6. The bait tank of claim 5 wherein valveless fluid conduit is a U-shaped construction.

7. The bait tank of claim 6 wherein the bottom has reinforcing ribs and interlocking means for securing the tank to the deck or swimstep of a boat.

8. A bait tank of claim 1 wherein the tank has a rectangular construction.

9. An improved bait tank comprising a container having a fluid inlet at or near the top of said container to cause liquid to be injected into the tank in a circular flow and an outlet at approximately the lower level of the liquid in the tank, said outlet connecting to an external pipe that rises to the desired height of fluid in the tank, said tank having a tight fitting cover with a central opening from which depends a lip for controlling splash, and interlocking means on the depending outer rim of said cover and on the depending rim of said tank, said interlocking means being a bolt and nut, the shaft of said bolt fitting in a slot on said depending rim of the tank and locks in position when twisted, the external fluid outlet means being a U-shaped construction and wherein the bottom of said bait tank has reinforcing ribs and interlocking means for securing said tank to the deck or swimstep of a boat.

10. An improved bait tank comprising a container having a substantially unobstructed interior in which bait is to be held and having a fluid inlet oriented in a first direction of sufficient size at or near the top of said container to cause liquid to be injected into the tank in sufficient volume to create a downward flow in said container, said tank having a fluid outlet at approximately the bottom of said tank, and having a fluid conduit exterior of said tank connected to said fluid outlet and extending upwardly to about said fluid inlet and being adapted for causing fluid flow from said fluid inlet downward to said fluid outlet, said fluid outlet being connected to an elongated, external pipe that extends to the height of fluid desired in the tank whereby the position of said external pipe relative to the fluid level in said bait tank causes fluid to flow from within said tank to the exterior thereof to thereby flush said bait tank, wherein the tank has a circular side wall, wherein said bait tank has a tight fitting cover with a central opening from which depends a lip for controlling splash, and interlocking means on the depending outer rim of the cover and the depending rim of the tank, wherein the interlocking means is a bolt and nut, the shaft of the bolt fits in a slot on the depending rim of the tank and locks in position when twisted, wherein the external fluid outlet means is a U-shaped construction, and wherein the bottom has reinforcing ribs and interlocking means for securing the tank to the deck or swimstep of a boat.

* * * * *